United States Patent
Ahn et al.

(10) Patent No.: US 12,013,499 B2
(45) Date of Patent: Jun. 18, 2024

(54) METHOD FOR SIMULTANEOUS ANALYSIS OF RADIOCARBON AND TRITIUM

(71) Applicant: KOREA ATOMIC ENERGY RESEARCH INSTITUTE, Daejeon (KR)

(72) Inventors: Hong Joo Ahn, Sejong-si (KR); Hwan Seo Park, Daejeon (KR); Jong Kwang Lee, Daejeon (KR); Ki Rak Lee, Daejeon (KR); Kwang Jae Son, Sejong-si (KR)

(73) Assignee: Korea Atomic Energy Research Institute, Daejeon (KR)

( * ) Notice: Subject to any disclaimer, the term of this patent is extended or adjusted under 35 U.S.C. 154(b) by 40 days.

(21) Appl. No.: 17/959,811

(22) Filed: Oct. 4, 2022

(65) Prior Publication Data

US 2023/0103847 A1   Apr. 6, 2023

(30) Foreign Application Priority Data

Oct. 5, 2021   (KR) .................. 10-2021-0131637

(51) Int. Cl.
*B01D 53/00*   (2006.01)
*B01D 53/04*   (2006.01)
(Continued)

(52) U.S. Cl.
CPC .............. *G01T 1/167* (2013.01); *B01D 53/04* (2013.01); *G01N 1/4022* (2013.01); *G01N 23/2202* (2013.01)

(58) Field of Classification Search
None
See application file for complete search history.

(56) References Cited

U.S. PATENT DOCUMENTS

2014/0121440 A1   5/2014   Laurent
2016/0310898 A1*  10/2016  Denton ................ C02F 1/4672
(Continued)

FOREIGN PATENT DOCUMENTS

JP   2007-127585 A   5/2007
JP   2017-096968 A   6/2017
(Continued)

OTHER PUBLICATIONS

Korean Office Action dated Oct. 16, 2023 issued in corresponding Korean Appln. No. 10-2021-0131637.
(Continued)

*Primary Examiner* — Hoon K Song
(74) *Attorney, Agent, or Firm* — Harness, Dickey & Pierce, P.L.C.

(57) ABSTRACT

The present invention relates to a method for simultaneous analysis of radiocarbon and tritium, the method including (i) mixing a radioactive waste sample containing a radiocarbon nuclide and tritiated water, and an oxidizing agent; (ii) oxidizing the radiocarbon nuclide in the radioactive waste sample to a gas containing an oxide of the radiocarbon nuclide by the oxidizing agent while suppressing volatilization of compounds containing gamma radionuclides other than the radiocarbon nuclide and tritium; (iii) discharging the gas containing an oxide of the radiocarbon nuclide by injecting an inert gas to the mixture; (iv) vaporizing and discharging the tritiated water in the mixture; and (v) analyzing radioactivity of radiocarbon and tritium from the discharged gas containing an oxide of the radiocarbon nuclide and tritiated water, and an apparatus for analysis of the same.

14 Claims, 1 Drawing Sheet

(51) Int. Cl.
  *G01N 1/40*  (2006.01)
  *G01N 23/2202*  (2018.01)
  *G01T 1/167*  (2006.01)

(56) References Cited

U.S. PATENT DOCUMENTS

| | | | |
|---|---|---|---|
| 2017/0206991 A1* | 7/2017 | Manabe | C02F 1/04 |
| 2020/0109069 A1 | 4/2020 | Yang et al. | |
| 2020/0230553 A1* | 7/2020 | Xiao | B01D 53/96 |

FOREIGN PATENT DOCUMENTS

| | | | |
|---|---|---|---|
| JP | 2017-106851 A | 6/2017 | |
| KR | 10-1999-0083814 A | 12/1999 | |
| KR | 10-2010-0047725 A | 5/2010 | |
| KR | 101171029 B1 | 8/2012 | |
| KR | 101233542 B1 | 2/2013 | |
| KR | 101907922 B1 | 10/2018 | |
| KR | 102043680 B1 | 11/2019 | |
| KR | 102046463 B1 | 11/2019 | |
| KR | 10-2022-0026506 A | 3/2022 | |

OTHER PUBLICATIONS

Korean Office Action dated Feb. 14, 2023 issued on corresponding Korean Appln. No. 10-2021-0110524.
Notice of Allowance dated Mar. 11, 2024 issued in corresponding Korean Appln. No. 10-2021-0131637.

* cited by examiner

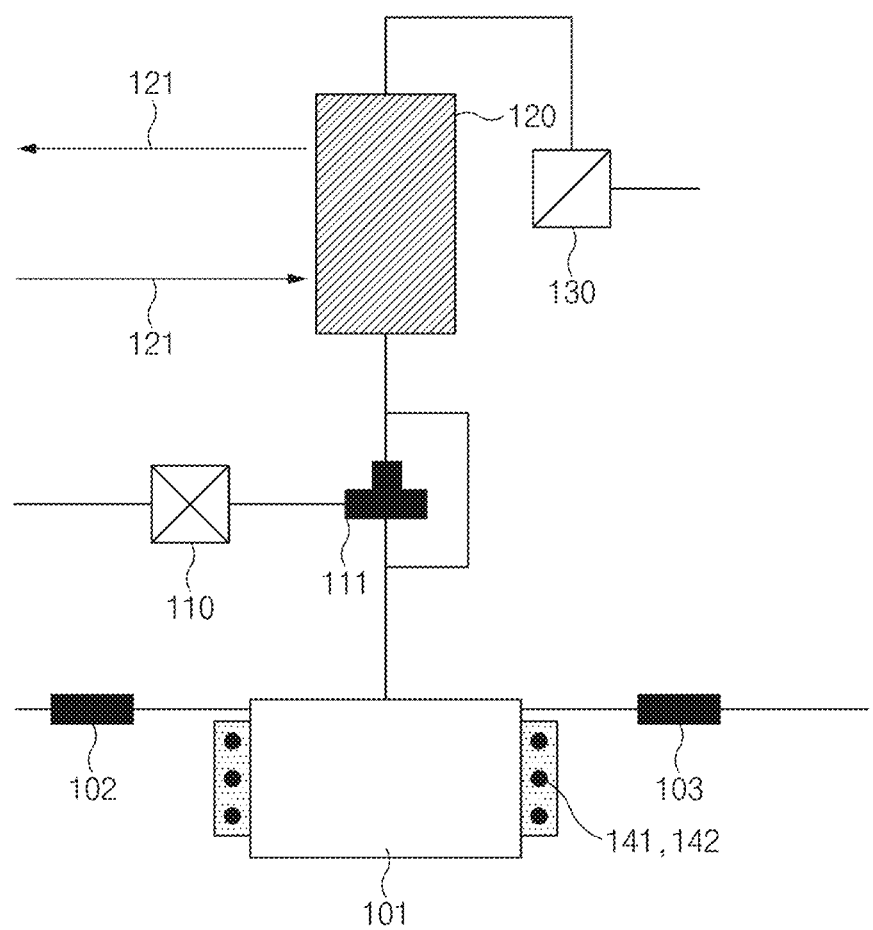

METHOD FOR SIMULTANEOUS ANALYSIS OF RADIOCARBON AND TRITIUM

CROSS-REFERENCE TO RELATED APPLICATION

This patent application claims the benefit of priority under 35 U.S.C. § 119(a) to Korean Patent Application No. 10-2021-0131637 filed on Oct. 5, 2021, the entire contents of which are incorporated herein by reference.

TECHNICAL FIELD

The present invention relates to a method for simultaneous analysis of radiocarbon and tritium through chemical oxidation at a low temperature, and an apparatus for analysis of the same.

BACKGROUND ART

Radioactive materials generated from activated carbon, waste resins and the like used in water purification and gaseous waste management in nuclear facilities may typically include radiocarbon and tritium. Radiocarbon ($^{14}C$) requires special management and monitoring compared to other radioactive compounds since it exists in the form of carbon dioxide in the atmosphere when released to the environment and may thereby be distributed over a wide area, and is not readily perished by having a long half-life, and may be fixed in living bodies through respiration or carbon assimilation by animals and plants or accumulated in the human body by going through the route of food chain. Meanwhile, tritium ($^{3}H$) is a radioactive material that emits beta ($\beta$) rays as an isotope of hydrogen ($H_2$) and has a very high concentration among radioactive waste materials, and accordingly, the concentration of tritium greatly affects radioactivity level-dependent classification of radioactive waste.

Regarding an analysis of radiocarbon and tritium in radioactive waste, a unique analysis method for each nuclide has been used for radiocarbon and tritium in radioactive waste so far. A method and system capable of simultaneously analyzing radiocarbon and tritium using a high temperature oxidation method has been developed, and is currently in use. The method for analyzing radiocarbon and tritium through a high temperature oxidation method is a method of complete oxidation by raising the temperature inside the sealed container to 800° C. or higher, and after the oxidation reaction, a liquid including tritium and carbon dioxide including radiocarbon are generated.

However, when organic and inorganic carbon compounds are present in large quantities in radioactive waste, the following problems may occur when using the high temperature oxidation method.

Since carbon dioxide containing a large amount of radiocarbon is generated much, i) a large amount of a collecting agent is required, and ii) measurement sensitivity may be reduced or measurements may not be possible due to decreased sensitivity in a radiocarbon measuring device. In addition, in order to resolve such problems, iii) a process of concentrating the radiocarbon-adsorbed collecting agent may be additionally required and iv) a significant amount of secondary radioactive waste may be generated in the collecting agent concentration process.

DISCLOSURE OF THE INVENTION

Technical Problem

The present invention has been made to overcome the above-described problems, and is directed to providing a method for convenient and simultaneous quantitative analysis of radiocarbon and tritium from radioactive waste, in which organic and inorganic carbon compounds such as spent activated carbon and waste resin are present in large quantities, through chemical oxidation at a low temperature, and an apparatus for analysis of the same.

Technical Solution

One embodiment of the present invention provides a method for simultaneous analysis of radiocarbon and tritium, the method including, (i) mixing a radioactive waste sample containing a radiocarbon nuclide and tritiated water, and an oxidizing agent; (ii) oxidizing the radiocarbon nuclide in the radioactive waste sample to a gas containing an oxide of the radiocarbon nuclide by the oxidizing agent while suppressing volatilization of compounds containing gamma radionuclides other than the radiocarbon nuclide and tritium; (iii) discharging the gas containing an oxide of the radiocarbon nuclide by injecting an inert gas to the mixture; (iv) vaporizing and discharging the tritiated water in the mixture; and (v) analyzing radioactivity of radiocarbon and tritium from the discharged gas containing an oxide of the radiocarbon nuclide and tritiated water.

In addition, another embodiment of the present invention provides an apparatus for simultaneous analysis of radiocarbon and tritium, the apparatus including, a reaction vessel for accommodating a radioactive waste sample containing a radiocarbon nuclide and tritiated water, and an oxidizing agent; an oxidizing agent supply unit provided in the reaction vessel; a first temperature control unit for maintaining a temperature for suppressing volatilization of compounds containing gamma radionuclides other than the radiocarbon nuclide and tritium; an inert gas supply unit provided in the reaction vessel; a unit connected to the reaction vessel for collecting and analyzing a gas containing an oxide of the radiocarbon nuclide; a second temperature control unit for vaporizing the tritiated water inside the reaction vessel; and a unit connected to the reaction vessel for collecting and analyzing the tritiated water.

Advantageous Effect

According to a method and an apparatus for simultaneous analysis of radiocarbon and tritium of the present invention, the amount of an adsorbent consumed during a radiocarbon treatment process can be minimized and sensitivity of radioactivity measurement can be enhanced, and at the same time, the process of analyzing radiocarbon and tritium in radioactive waste can be simplified by skipping post-treatment processes such as concentration of the adsorbent. In addition, an effect of minimizing the amount of secondary radioactive waste generated during the radiocarbon and tritium analysis process can be obtained as well.

BRIEF DESCRIPTION OF THE DRAWINGS

The FIGURE is a diagram schematically illustrating an apparatus for simultaneous analysis of radiocarbon and tritium according to one embodiment of the present disclosure.

BEST MODE FOR CARRYING OUT THE INVENTION

Hereinafter, a method and an apparatus for simultaneous analysis of radiocarbon and tritium, which are the present disclosure, will be described in detail with reference to accompanying drawings so that those skilled in the art readily implements the present disclosure.

The method for simultaneous analysis of a radiocarbon nuclide and tritium according to the present invention includes (i) mixing a radioactive waste sample containing a radiocarbon nuclide and tritiated water, and an oxidizing agent; (ii) oxidizing the radiocarbon nuclide in the radioactive waste sample to a gas containing an oxide of the radiocarbon nuclide by the oxidizing agent while suppressing volatilization of compounds containing gamma radionuclides other than the radiocarbon nuclide and tritium; (iii) discharging the gas containing an oxide of the radiocarbon nuclide by injecting an inert gas to the mixture; (iv) vaporizing and discharging the tritiated water in the mixture; and (v) analyzing radioactivity of radiocarbon and tritium from the discharged gas containing an oxide of the radiocarbon nuclide and tritiated water, and the steps (i) to (v) may be repeatedly performed.

In the step (i), the radiocarbon nuclide includes $^{14}C$, and the radioactive waste sample containing such a radiocarbon nuclide may be present in forms including an inorganic-type radiocarbon nuclide-containing compound {carbon dioxide ($^{14}CO_2$), carbon monoxide ($^{14}CO$), carbon ($^{14}C$) isotope or the like} and an organic-type radiocarbon nuclide-containing compound {hydrocarbon ($^{14}C_mH_n$), mainly methane ($CH_4$)}, and may particularly include an inorganic-type or organic-type radiocarbon nuclide-containing compound {carbon monoxide ($^{14}CO$), carbon ($^{14}C$)) isotope, hydrocarbon ($^{14}C_mH_n$) or the like} capable of being converted to radioactive carbon dioxide ($^{14}CO_2$) by the oxidizing agent in the step (ii). In addition, the tritium ($^3H$) may be present in a liquid form of tritiated water in the radioactive waste sample, and may specifically include at least any one selected from the group consisting of $T_2O$, HTO and DTO. In addition, since removing tritium in a liquid form is more difficult than removing tritium in a gaseous form, a process of vaporizing the tritiated water and separating tritium in a vapor state may be required.

In the step (i), the oxidizing agent may be introduced to the oxidizing agent supply unit connected to the reaction vessel holding the sample, and the sample and the oxidizing agent may be mixed through stirring.

The oxidizing agent may include at least any one selected from the group consisting of $H_2SO_4$, $HNO_3$, HCl, $H_3PO_4$, $K_2S_2O_8$, $KMnO_4$, $K_2CrO_7$ and mixtures thereof, and may preferably include any one selected from among $H_2SO_4$, $HNO_3$, $K_2S_2O_8$ and mixtures thereof. In addition, the oxidizing agent and an auxiliary oxidizing agent may be properly mixed and used depending on the sample type, and as the oxidizing agent, $H_2SO_4$, $HNO_3$, HCl or $H_3PO_4$ may be used and as the auxiliary oxidizing agent, $K_2S_2O_8$, $KMnO_4$ or $K_2CrO_7$ may be used.

In the step (ii), the radiocarbon nuclide-containing compound ($^{14}CO$ or the like) or the organic-type radiocarbon nuclide-containing compound {hydrocarbon ($^{14}C_mH_n$) or the like} included in the sample may be separated after being converted to inorganic-type gas radioactive carbon dioxide ($^{14}CO_2$) using the oxidizing agent injected through the oxidizing agent supply unit. Specifically, the separation uses sulfuric acid, nitric acid, potassium peroxide disulfate ($K_2S_2O_8$) or an oxidizing agent obtained by mixing these, which is a strong oxidizing agent, to convert the inorganic-type or organic-type radiocarbon nuclide-containing compound into inorganic-type radioactive carbon dioxide ($^{14}CO_2$) in the reaction vessel, and herein, silver nitrate ($AgNO_3$) may be used as a catalyst.

In addition, the step (ii) may include a reaction of immersing the radioactive waste sample in an acidic solution of sulfuric acid or nitric acid having an acidity of 1 to 4 in the reaction vessel, and desorbing (separating) the inorganic-type radioactive carbon dioxide ($^{14}CO_2$) adsorbed to the radioactive waste sample to a gas phase to discharge the inorganic-type radioactive carbon dioxide ($^{14}CO_2$) to an upper part of the reaction vessel. The upper part of the reaction vessel may be connected to the unit for collecting and analyzing the tritiated water.

The reaction of oxidizing the radiocarbon nuclide in the radioactive waste sample to the gas containing an oxide of the radiocarbon nuclide by the oxidizing agent in the step (ii) may be conducted at a temperature of 60° C. to 95° C.

The temperature range of 60 to 95° C. is a relatively low temperature compared to a high temperature treatment method, a prior art. When the oxidation reaction of the radiocarbon nuclide using the oxidizing agent is conducted at a high temperature of higher than 95° C., some volatile gamma nuclides ($^{137}Cs$, $^{137}Cs$ and the like) in the radioactive waste may be included in the radiocarbon nuclide and tritium extract causing a problem of interference in the radioactivity measurement, whereas, when the oxidation reaction of the radiocarbon nuclide using the oxidizing agent is conducted at the above-mentioned temperature range, the radiocarbon nuclide may be purely separated without such a problem, and, instead of the oxidizing agent oxidizing the whole sample, the material surface of the sample containing the radiocarbon nuclide may be chemically and locally decomposed to purely separate the radiocarbon nuclide from the sample.

The oxidation reaction temperature in the step (ii) may be obtained through the first temperature control unit connected to the reaction vessel. The first temperature control unit may use a direct heating method through a heat source rather than an indirect heating method such as heating medium oil. The first temperature control unit may be a halogen heater, a carbon heater, a quartz tube heater, a far-infrared heater, a near-infrared heater, an electric heater, a strip heater, a tube heater, a band heater, a heating cable (hot wire), a PTC (positive temperature coefficient) heater or the like. Preferably, a halogen heater may be used due to properties such as high efficiency, long lifetime, capable of heating at a proper temperature, and particularly, not being readily broken even when brought into contact with water vapor or water at a high temperature.

The oxidization reaction time in the step (ii) may be from 1 hour to 5 hours and may preferably be from 1 hour to 3 hours. The reaction time of shorter than 1 hour may have a problem of reducing a recovery rate due to the incomplete oxidation reaction of organic-type radiocarbon, and the reaction time of longer than 5 hours may have a problem of reducing analysis efficiency and reaction material coagulation.

The step (iii) includes a step of injecting an inert gas to the reaction vessel, in which the sample and the oxidizing agent are mixed, to discharge the gas containing an oxide of the radiocarbon nuclide separated from the radioactive sample through the step (ii).

The inert gas may include at least any one selected from the group consisting of nitrogen ($N_2$), helium (He), argon (Ar) and mixtures thereof, and preferably, high-purity nitrogen or helium may be used.

The inert gas may flow at a flow rate of 5 cc to 100 cc per minute. The inert gas having a flow rate of less than 5 cc per minute may have a problem in that the gas containing an oxide of the radiocarbon nuclide may not be transported to the upper part of the reaction vessel. The inert gas having a flow rate of greater than 100 cc per minute may have a problem in that the gas containing an oxide of the radiocarbon nuclide is not able to be captured by an adsorbent in the reaction vessel and is discharged outside and efficiency is reduced due to rapid volatilization of the adsorbent, and in some cases, there may be a problem in that volatile gamma nuclides remaining in the reaction material are included in the radiocarbon nuclide adsorbent.

The step (iv) includes a step of vaporizing and discharging tritiated water in the mixture remaining in the reaction vessel after the step (iii).

Among the radioactive nuclides included in the radioactive waste sample containing radiocarbon nuclide and tritium, a volatile nuclide may be, in addition to the tritium ($^3$H), radiocarbon ($^{14}$C), radioactive cesium ($^{137}$Cs), radioactive iodine ($^{129}$I), radioactive technetium ($^{99}$Tc) or the like. Among these, tritium-containing water molecules have the same properties as common water molecules and readily vaporize at 100° C. or higher, radioactive cesium ($^{137}$Cs) may vaporize at 450° C., and radiocarbon ($^{14}$C), radioactive iodine ($^{129}$I) and radioactive technetium ($^{99}$Tc) may vaporize at 800° C. or higher.

Accordingly, the temperature for evaporating the tritium-containing water vapor from the tritium-containing radioactive waste may be from 100° C. to 150° C., and preferably 100° C. By evaporating at a proper temperature as above, only tritium may be efficiently evaporated among the volatile nuclides included in the tritium-containing radioactive solid waste.

In order to evaporate the tritium-containing water vapor from the tritium-containing radioactive solid waste, a temperature of the reaction vessel may be controlled through the second temperature control unit connected to the reaction vessel. Evaporation of the tritium-containing water vapor may use a direct heating method through a heat source rather than an indirect heating method such as heating medium oil. Specifically, the second temperature control unit may be a halogen heater, a carbon heater, a quartz tube heater, a far-infrared heater, a near-infrared heater, an electric heater, a strip heater, a tube heater, a band heater, a heating cable (hot wire), a PTC (positive temperature coefficient) heater or the like. Preferably, a halogen heater may be used in a manner of evaporating the tritium-containing water vapor due to properties such as high efficiency, long lifetime, capable of heating at a proper temperature, and particularly, not being readily broken even when brought into contact with water vapor or water at high temperature.

After evaporating the tritium-containing water vapor, a step of collecting the tritium-containing water in the unit for collecting the tritium by condensing the evaporated tritium-containing water vapor again in a cooling tower may be further included.

The step (v) includes analyzing radioactivity of radiocarbon and tritium from the gas containing an oxide of the radiocarbon nuclide and the tritiated water discharged from the upper part of the reaction vessel. The gas containing an oxide of the radiocarbon nuclide and the tritium collected after reacting for a certain period of time are mixed with a scintillator which has the same or higher volume ratio to the gas containing an oxide of the radiocarbon, and radioactivity thereof may be measured using a liquid scintillator counter.

The liquid scintillator counter is a device for indirectly measuring radiation of relatively low energy using a light emitting body, and a principle thereof is as follows.

Beta rays that radioactive nuclides such as $^3$H and $^{14}$C have very low energy and have a beam path length of a few mm or less in the air, and therefore, do not pass through a test tube wall or a crystalline fluorescent substance protective film. Accordingly, beta rays of these nuclides need to be measured indirectly using a light emitting body in a liquid state and by dissolving the sample therein. In the light emission of a liquid fluorescent substance by radiation excitation, solvent molecules absorbing radiation energy are excited, and when energy transfer occurs between the excited solvent molecules, energy is transferred from the excited solvent molecules to solute molecules, and light emission occurs from these solute molecules. Two photomultiplier tubes of the liquid scintillator counter receive this light emission and convert the light emission to an electric pulse, and the number of occurrences is counted using a simultaneous measurement method.

According to the method for simultaneous analysis of radiocarbon and tritium of the present disclosure, recovery rates of the radiocarbon and the tritium may be from 90% to 97% after the steps (i) to (iv).

An apparatus for simultaneous analysis of radiocarbon and tritium according to another embodiment of the present invention will be described in detail.

The FIGURE schematically illustrates an apparatus for simultaneous analysis of radiocarbon and tritium of the present disclosure.

According to the FIGURE, the apparatus for simultaneous analysis of radiocarbon and tritium may include a reaction vessel 101 for accommodating a radioactive waste sample containing a radiocarbon nuclide and tritiated water, and an oxidizing agent; an oxidizing agent supply unit 102 provided in the reaction vessel; a first temperature control unit 141 for maintaining a temperature for suppressing volatilization of compounds containing gamma radionuclides other than the radiocarbon nuclide and tritium; an inert gas supply unit 103 provided in the reaction vessel; a unit 130 connected to the reaction vessel for collecting and analyzing a gas containing an oxide of the radiocarbon nuclide; a second temperature control unit 142 for vaporizing the tritiated water inside the reaction vessel; and a unit 110 connected to the reaction vessel for collecting and analyzing the tritiated water.

Hereinafter, each apparatus will be described in detail.

The reaction vessel is for accommodating a radioactive waste sample containing a radiocarbon nuclide and tritiated water, and an oxidizing agent, and may be connected to the oxidizing agent supply unit, the inert gas supply unit, the unit for collecting and analyzing a gas containing an oxide of the radiocarbon nuclide, the unit for collecting and analyzing the tritiated water, the first temperature control unit and the second temperature control unit.

The oxidizing agent supply unit may perform a role of supplying the oxidizing agent to the reaction vessel in order to purely separate the radiocarbon nuclide from the sample by reacting the radioactive waste sample and the oxidizing agent and chemically and locally decomposing a surface of the sample containing the radiocarbon nuclide.

The inert gas supply unit may perform a role of supplying an inert gas to the reaction vessel in order to discharge the gas containing an oxide of the radiocarbon nuclide separated through the oxidation reaction from the reaction vessel.

The inert gas supply unit may be connected in a way that the inert gas is injected to a lower end of the reaction vessel, and the lower end of the inert gas supply unit may include micropores having a diameter of 0.002 mm to 0.015 mm. By having such micropores, the inert gas is supplied to the reaction vessel in a micro bubbling form performing a role of delivering the reaction material to the micropores present in the radioactive waste sample while activating circulation of the sample in the reaction vessel, which enables complete extraction of radiocarbon and tritium adsorbed to the radioactive waste sample.

The first temperature control unit is for maintaining a temperature for suppressing volatilization of compounds containing gamma radionuclides having volatility other than the radiocarbon nuclide and tritium, and may maintain a temperature of 60° C. to 95° C.

The second temperature control unit is for vaporizing the tritiated water inside the reaction vessel, and the temperature may be from 100° C. to 150° C., and preferably, may be 100° C. to 120° C.

The first temperature control unit and the second temperature control unit are each separated and connected to the reaction vessel, or one temperature control unit is connected to the reaction vessel and performs a role of the first temperature control unit and second temperature control unit, and the type is not limited thereto.

The unit for collecting and analyzing a gas containing an oxide of the radiocarbon nuclide provides a space for accommodating the gas containing an oxide of the radiocarbon nuclide transported through the inert gas, and the collected gas may be analyzed using a liquid scintillator counter.

The unit for collecting and analyzing the tritiated water provides a space for accommodating tritium which has vaporized by the second temperature control unit inside the reaction vessel, and the collected tritium may be analyzed using a liquid scintillator counter.

In addition, the apparatus for simultaneous analysis of radiocarbon and tritium may further include a 3-way value between the reaction vessel, the unit for collecting the tritium and the unit for collecting the gas containing an oxide of the radiocarbon nuclide. The 3-way valve performs a role of transferring tritium liquefied from a cooling tower to the unit for collecting the tritium and a role of controlling a flow rate of the inert gas transporting the gas containing an oxide of the radiocarbon nuclide discharged from the reaction vessel, and may adjust the inert gas to flow at a flow rate of 5 cc to 100 cc per minute, preferably 10 cc to 100 cc per minute, and more preferably 20 cc to 100 cc per minute.

The apparatus for simultaneous analysis of radiocarbon and tritium may further include a cooling tower between the reaction vessel and the unit for collecting and analyzing a gas containing an oxide of the radiocarbon nuclide. As the inert gas transporting the gas containing an oxide of the radiocarbon nuclide passes through the cooling tower, the gas containing an oxide of the radiocarbon nuclide is introduced into the unit for collecting and analyzing a gas containing an oxide of the radiocarbon nuclide in a condensed state.

Hereinafter, the present invention will be described more specifically with reference to examples. However, these examples are only to help understand the present disclosure, and the scope of the present invention is not limited to these examples in any sense.

<Example 1> Evaluation on Efficiency of Apparatus for Simultaneous Analysis of Radiocarbon and Tritium Using the apparatus for simultaneous analysis of radiocarbon and tritium illustrated in the FIGURE, radiocarbon and tritium included in an activated carbon sample were separated and analyzed.

About 1 g of activated carbon to which 11.9 Bq of radiocarbon ($^{14}C$) and 10.5 Bq of tritium ($^{3}H$) were added was introduced to a reaction vessel 101, and 3 M of $H_2SO_4$ as an oxidizing agent and $AgNO_3$ as an auxiliary oxidizing agent were injected to the reaction vessel through an oxidizing agent supply unit 102, and after flowing 20 cc/min to 100 cc/min of He gas to an inert gas supply unit 103, the result was reacted for 3 hours at a temperature of about 90° C.

Radiocarbon gas extracted during the oxidation reaction was passed through a 3-way valve 111 and a cooling tower 120, and was finally collected by a radiocarbon collector 130. After that, extracted tritium was completely collected in a tritium collecting vessel 110 from the cooling tower by operating the 3-way valve 111.

Results of Example 1 using the technique of the present invention with an activated carbon standard material are as shown in the following Tables 1 and 2. Table 1 shows a recovery rate of radiocarbon recovered from the activated carbon sample, and Table 2 shows a recovery rate of tritium recovered from the activated carbon sample. By using the apparatus for simultaneous analysis of the present disclosure, radiocarbon and tritium were simultaneously separated and a high recovery rate of about 95% or greater was obtained on average, and through this, it was identified that radiocarbon and tritium were simultaneously analyzed efficiently.

TABLE 1

| | Radioactivity Amount of $^{14}C$ (Bq) | | |
|---|---|---|---|
| Category | Initial Amount | Analysis Result | Recovery (%) |
| 1 | 11.9 | 11.8 | 99 |
| 2 | 11.9 | 11.4 | 95 |
| 3 | 11.9 | 11.3 | 90 |

TABLE 2

| | Radioactivity Amount of $^{3}H$ (Bq) | | |
|---|---|---|---|
| Category | Initial Amount | Analysis Result | Recovery (%) |
| 1 | 10.5 | 10.4 | 99 |
| 2 | 10.5 | 10.5 | 100 |
| 3 | 10.5 | 10.3 | 99 |

<Example 2> Evaluation on Efficiency of Apparatus for Simultaneous Analysis of Radiocarbon and Tritium According to Low Temperature Oxidation Method Low temperature chemical analysis and high temperature heat treatment analysis were performed in the same manner as in Example 1 except that, in order to quantify tritium and radiocarbon, the reaction temperatures were respectively changed to 60° C. to 95° C. and 650° C. to 700° C., and a waste resin generated from a power plant was used as the sample. The analysis results are shown in Table 3. It was seen that both radiocarbon and tritium had a higher radiation content in the high temperature heat treatment analysis than in the low temperature chemical analysis, and therefore, it may be inferred that other materials having volatility are detected together with radiocarbon and tritium in the high temperature heat treatment.

TABLE 3

| | Analysis Result (Bq/g) | |
|---|---|---|
| Category | Low Temperature Chemical Analysis | High Temperature Heat Treatment Analysis |
| $^{14}C$ | 230 | 250 |
| $^{3}H$ | 360 | 24000 |

In addition, in order to check the content of other nuclides that may interfere with radiation analysis in each of the radiocarbon and tritium extracts to which low temperature chemical analysis and high temperature heat treatment analysis techniques were applied, a test was conducted using a gamma spectrometer, and the results are shown in Tables 4 and 5.

Table 4 shows analysis results for the radiocarbon, and Table 5 shows analysis results for the tritium, and in both cases, some gamma nuclides were detected only in the high temperature heat treatment analysis technique, and other gamma nuclides were not found in the low temperature chemical analysis. This means that, when using the high temperature heat treatment analysis technique, some gamma nuclides were extracted together with radiocarbon and tritium due to the high temperature, and it was identified that radiocarbon and tritium were able to be simultaneously analyzed more precisely through the low temperature chemical analysis of the present disclosure.

TABLE 4

| | Radioactivity Value (Bq/g) | |
|---|---|---|
| $^{14}C$ Extract | Low Temperature Chemical Analysis | High Temperature Heat Treatment Analysis |
| $^{60}Co$ | ND | ND |
| $^{134}Cs$ | ND | 21 |
| $^{137}Cs$ | ND | 43 |

TABLE 5

| | Radioactivity Value (Bq/g) | |
|---|---|---|
| $^{3}H$ Extract | Low Temperature Chemical Analysis | High Temperature Heat Treatment Analysis |
| $^{60}Co$ | ND | 340 |
| $^{134}Cs$ | ND | 1100 |
| $^{137}Cs$ | ND | 1400 |

<Example 3> Evaluation on Efficiency of Apparatus for Simultaneous Analysis of Radiocarbon and Tritium Depending on Flow Rate of Inert Gas Analysis on the radiocarbon was performed under the same condition as in Example 1 except that the flow rate of He gas, the inert gas, was changed, and the results are shown in the following Table 6. As a result of Example 3, it was seen that the amount of extracted radiocarbon increased as the flow rate of the inert gas increased, and particularly, the effect was maximized when having a flow rate of 20 cc/min or greater.

TABLE 6

| Inert Gas Flow Rate (cc/min) | Radioactivity Amount of $^{14}C$ (Bq) | | Recovery (%) |
|---|---|---|---|
| | Initial Amount | Analysis Result | |
| 0 | 700 | 315 | 45 |
| 0 to 5 | 700 | 454 | 64.9 |
| 20 to 100 | 700 | 671 | 95.8 |

What is claimed is:

1. A method for simultaneous analysis of radiocarbon and tritium, the method comprising:
    (i) mixing a radioactive waste sample containing a radiocarbon nuclide and tritiated water, and an oxidizing agent;
    (ii) oxidizing the radiocarbon nuclide in the radioactive waste sample to a gas containing an oxide of the radiocarbon nuclide by the oxidizing agent while suppressing volatilization of compounds containing gamma radionuclides other than the radiocarbon nuclide and tritium;
    (iii) discharging the gas containing an oxide of the radiocarbon nuclide by injecting an inert gas to the mixture;
    (iv) vaporizing and discharging the tritiated water in the mixture; and
    (v) analyzing radioactivity of radiocarbon and tritium from the discharged gas containing an oxide of the radiocarbon nuclide and tritiated water.

2. The method of claim 1, wherein a temperature of 60° C. to 95° C. is maintained in (ii) above.

3. The method of claim 1, wherein the oxidizing agent in (i) above includes at least any one selected from the group consisting of $H_2SO_4$, $HNO_3$, $HCl$, $H_3PO_4$, $K_2S_2O_8$, $KMnO_4$ and $K_2CrO_7$.

4. The method of claim 1, wherein the oxidation reaction time in (ii) above is from 1 hour to 5 hours.

5. The method of claim 1, wherein the inert gas in (iii) above includes at least any one selected from the group consisting of $N_2$, He and Ar.

6. The method of claim 1, wherein the inert gas in (iii) above flows at a flow rate of 5 cc to 100 cc per minute.

7. The method of claim 1, wherein recovery rates of the radiocarbon and the tritium are from 90% to 97% after (i) to (iv) above.

8. The method of claim 1, wherein the radiocarbon nuclide includes $^{14}C$, and the oxide of the radiocarbon nuclide includes $^{14}CO_2$.

9. The method of claim 1, wherein the tritiated water includes at least any one selected from the group consisting of $T_2O$, HTO and DTO.

10. An apparatus for simultaneous analysis of radiocarbon and tritium, the apparatus comprising:
    a reaction vessel for accommodating a radioactive waste sample containing a radiocarbon nuclide and tritiated water, and an oxidizing agent;
    an oxidizing agent supply unit provided in the reaction vessel;
    a first temperature control unit for maintaining a temperature for suppressing volatilization of compounds containing gamma radionuclides other than the radiocarbon nuclide and tritium;
    an inert gas supply unit provided in the reaction vessel;

a unit connected to the reaction vessel for collecting and analyzing a gas containing an oxide of the radiocarbon nuclide;

a second temperature control unit for vaporizing the tritiated water inside the reaction vessel; and a unit connected to the reaction vessel for collecting and analyzing the tritiated water.

11. The apparatus of claim 10, wherein the first temperature control unit is for maintaining a temperature of 60° C. to 95° C.

12. The apparatus of claim 10, further comprising a 3-way value between the reaction vessel, the unit for collecting the tritium and the unit for collecting a gas containing an oxide of the radiocarbon nuclide.

13. The apparatus of claim 10, wherein the inert gas supply unit includes micropores.

14. The apparatus of claim 10, wherein the micropores have a diameter of 0.002 mm to 0.015 mm.

\* \* \* \* \*